United States Patent
Park

(10) Patent No.: US 6,659,055 B2
(45) Date of Patent: Dec. 9, 2003

(54) VALVE-TIMING CONTROL METHOD AND APPARATUS FOR CONTROLLING VALVE TIMING OF A VALVE OF AN ENGINE

(75) Inventor: Yong-Jung Park, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/265,427

(22) Filed: Oct. 4, 2002

(65) Prior Publication Data

US 2003/0066501 A1 Apr. 10, 2003

(30) Foreign Application Priority Data

Oct. 9, 2001 (KR) .................................... 2001-0062045

(51) Int. Cl.$^7$ ................................................. F01L 1/34
(52) U.S. Cl. ................................ 123/90.17; 123/90.16; 123/90.15; 123/90.31
(58) Field of Search .......................... 123/90.17, 90.16, 123/90.15, 90.12, 90.18, 90.31; 701/105, 115

(56) References Cited

U.S. PATENT DOCUMENTS 5,611,304 A * 3/1997 Shinojima ................ 123/90.15
6,196,173 B1 * 3/2001 Takahashi et al. ....... 123/90.15
6,338,323 B1 * 1/2002 Machida .................. 123/90.17

OTHER PUBLICATIONS

U.S. patent application Publication No. 2002/0010540, Jan. 24, 2002, Moriya et al., Valve Timing Control Apparatus and Method of Internal Combustion Engine, Figures 6–10.*

* cited by examiner

Primary Examiner—Thomas Denion
Assistant Examiner—Kyle Riddle
(74) Attorney, Agent, or Firm—Pennie & Edmonds LLP

(57) ABSTRACT

When a target timing is determined, a current duty-ratio of a solenoid valve is initially adjusted based on a learned initial value, and then gradually adjusted until a current valve timing corresponds to the target timing. The initial value is chosen from learned initial advance and retard values from a map having independent variables of fluid temperature and battery voltage.

7 Claims, 3 Drawing Sheets

VALVE-TIMING CONTROL METHOD AND APPARATUS FOR CONTROLLING VALVE TIMING OF A VALVE OF AN ENGINE

FIELD OF THE INVENTION

The present invention relates to a valve-timing control method and apparatus for controlling the timing of a valve of an engine.

BACKGROUND OF THE INVENTION

An internal combustion engine is an apparatus for generating power by taking in air and fuel, and burning them in a combustion chamber. The engine is equipped with an intake valve for taking the air and fuel into the combustion chamber, and an exhaust valve for exhausting the burned gas from the combustion chamber. The intake and exhaust valves are usually driven by one or more camshafts.

The valve timing controls when the valves open and close with respect to the ignition spark. Preferable valve timing (referred as target timing hereinafter) may depend on engine revolution speed, engine load, etc. Therefore, variable valve-timing (VVT) apparatuses have recently been developed wherein the rotation of the camshaft is not fixed with respect to the rotation of a crankshaft, and it has relative rotational movement within a predetermined range.

A continuously variable valve-timing (CVVT) apparatus, a kind of VVT apparatus, can control the valve timing continuously within a particular range. A conventional CVVT apparatus includes a rotary piston arrangement whereby the position of the camshaft may be advanced or delayed through hydraulic control. Typically, the hydraulic pressure is controlled by means including a duty-controlled solenoid valve. The solenoid valve is in turn controlled by an electronic control unit (ECU) such that the valve timing can be continuously controlled by duty-control of the solenoid valve.

In order to control the valve timing, the ECU changes the duty-ratio to one corresponding to target timing. To this end, according to the prior art, the ECU repeatedly changes the duty-ratio of the solenoid valve by a predetermined change value until the target timing is realized.

However, according to this simple method for controlling valve timing, significant time is consumed in changing the valve timing to the target timing. Also, if the predetermined change value is preset at a high value, an abrupt change in valve timing may cause misfire.

Examples of characteristic curves for valve timing in relation to the duty-ratio of the solenoid valve, with respect to a plurality of oil temperatures, are shown in FIG. 2. In this figure the horizontal axis denotes the duty-ratio of the solenoid valve, and the vertical axis denotes valve timing. The amount of fluid provided to the CVVT apparatus under control of the solenoid valve depends on fluid temperature and battery voltage. As shown in FIG. 2, resultant valve timing is not proportional to the varying duty-ratio of the solenoid valve. Instead its dependency forms a curve with a flat region near a certain valve timing.

Therefore, for example referring to the curve of the fluid temperature being −20 deg. C., the resultant valve timing does not substantially change while the duty-ratio is being repeatedly increased from a point A to a point B and vice versa. This means that a slow response of valve timing control occurs from the point A to the point B, and vice versa.

However, if the predetermined change value is increased, the valve timing control loses precision. And if the duty-ratio is abruptly changed to below point B in the case that the target timing is near point B, sudden retarding occurs which may cause misfire. Accordingly, there is a need in the art for a continuously variable valve-timing control method and apparatus that enables more rapid and more precise control of the timing of a valve of an engine.

SUMMARY OF THE INVENTION

An exemplary valve-timing control method according to an embodiment of the present invention includes measuring a current valve timing, determining a target timing for the valve timing, initially-adjusting a current duty-ratio of an actuator adapted to vary the valve timing by a learned initial value, and gradually-adjusting the current duty-ratio until the current valve timing corresponds to the target timing.

The gradually-adjusting of the current duty-ratio may include detecting a current valve timing, determining if the current valve timing corresponds to the target timing, and adjusting the current duty-ratio of the actuator by a predetermined value when the current valve timing does not correspond to the target timing. The current valve timing is considered as corresponding to the target timing when the current valve timing is within a predetermined range of the target timing.

When the adjusting of the current duty-ratio is completed, the detecting a current valve timing is executed such that the current duty-ratio is gradually adjusted. The gradually-adjusting the current duty-ratio stops when the valve timing corresponds to the target timing.

The learned initial value is preferably retrieved from a map having independent variables including fluid temperature, with the fluid being used for control of the valve timing. The initial value is preferably chosen from a plurality of values including an initial advance value and an initial retard value. The initial advance value is preferably an initial value of adjustment when the target timing is advanced from the current valve timing, and the initial retard value is preferably an initial value of adjustment when the target timing is retarded from the current valve timing.

The method of the present invention may further include determining if a condition for learning the initial value is satisfied, learning the initial advance value when the condition for learning the initial value is satisfied, learning the initial retard value when the condition for learning the initial value is satisfied, and storing the initial advance value and initial retard value, such that the initial value is preferably learned. The condition for learning the initial value may be satisfied if the fluid temperature of the control fluid lies within a predetermined temperature range, the battery voltage lies within a predetermined voltage range, and the current valve timing lies within a predetermined timing range.

Learning the initial advance value may comprise recursively adjusting the current duty-ratio of the actuator by a predetermined advance increment until the valve timing is advanced by more than a predetermined timing amount. In that case, the initial advance value is preferably learned as a difference between the initial current duty-ratio before recursive adjustment and the current duty-ratio recursively adjusted to just before the valve timing is advanced by more than the predetermined timing amount.

Learning the initial retard value may comprise recursively adjusting the current duty-ratio of the actuator by a predetermined retard increment until the valve timing is retarded by more than a predetermined timing amount. In that case, the initial retard value is preferably learned as a difference between the initial current duty-ratio before recursive adjustment and the current duty-ratio recursively adjusted to just before the valve timing is retarded by more than the predetermined timing amount. Preferably the initial values are stored based on parameters including the fluid temperature and the battery voltage.

In a further aspect of the invention a valve-timing control apparatus is provided. In one embodiment, a valve-timing detector is adapted to detect valve timing. An advance chamber and a retard chamber advance and retard the valve timing by inflow of hydraulic fluid. A hydraulic pump generates hydraulic pressure supplied to the advance and retard chambers. A proportional valve controls a proportion of the generated hydraulic pressure supplied to the advance chamber and retard chamber. An actuator controls operation of the proportional valve based on signals from an electronic control unit which is programmed to execute predetermined instructions for duty-control of the actuator.

The valve-timing control apparatus preferably further includes a temperature detector for detecting fluid temperature and a voltage detector for detecting battery voltage. The electronic control unit can be realized by one or more microprocessors in which a program for executing the predetermined instructions is implemented.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will hereinafter be described in detail with reference to the accompanying drawings.

Figure 1:
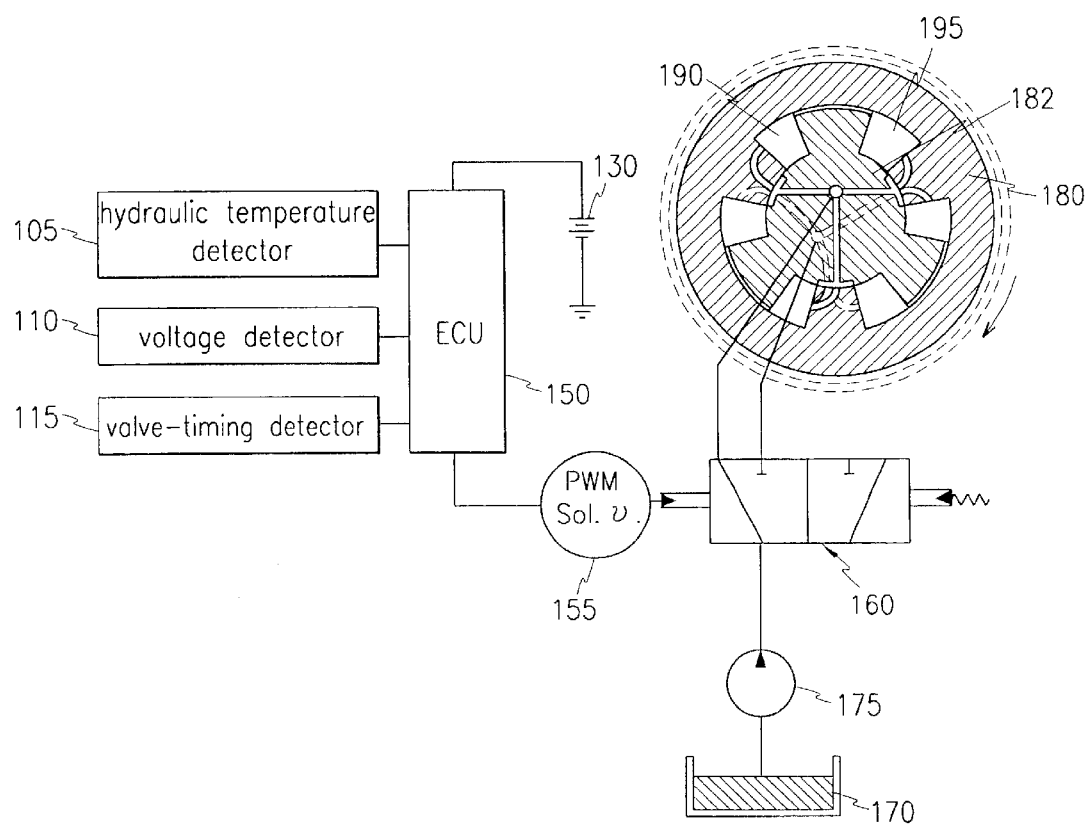
FIG. 1 is a schematic diagram of a continuously variable valve-timing control apparatus according to a preferred embodiment of the present invention.

As shown in FIG. 1, a valve-timing control apparatus for controlling the timing of a valve of an engine according to a preferred embodiment of the invention includes a plurality of sensors or detectors communicating with a control unit to control hydraulic fluid flow to advance and retard chambers. More specifically, temperature detector 105 detects the fluid temperature of the hydraulic fluid used for control of the valve timing. Voltage detector 110 detects the voltage of battery 130. Valve-timing detector 115 is adapted to detect the valve timing. Valve-timing detector 115 may be a hall sensor disposed at the camshaft, of which various constitutions will be apparent to those skilled in the art.

A cam sprocket 180 and vane 182 together form advance chamber 190 for advancing the valve timing by inflow of hydraulic fluid and retard chamber 195 for retarding the valve timing by inflow of hydraulic fluid. Cam sprocket 180 is rotated by torque delivered from a crankshaft (not shown) by a device such as a timing belt (not shown). Vane 182 is in turn connected to the camshaft (not shown). Hydraulic paths are formed to provide each of the advance and retard chambers 190 and 195 with hydraulic fluid.

FIG. 1 illustrates a cam sprocket that rotates clockwise. Thus, if hydraulic fluid flows into advance chamber 190, vane 182 rotates in an advancing direction with respect to rotation of the cam sprocket 180. Accordingly, the rotational angle of the camshaft, which is connected to the vane 182, is also advanced and therefore the valve timing is advanced. On the other hand, if hydraulic fluid flows into retard chamber 195, vane 182 rotates in a retarding direction with respect to rotation of cam sprocket 180. Accordingly, the rotational angle of the camshaft is also retarded and therefore the valve timing is retarded.

Hydraulic pump 175 generates hydraulic pressure, preferably by being driven by the vehicle engine (not shown). A typical engine oil, used for lubricating the engine, may be used for the hydraulic fluid in a preferred embodiment of the present invention. Accordingly, the hydraulic pump 175 draws in engine oil from an oil pan 170 positioned at the bottom of the engine and supplies the engine oil to proportional valve 160. The fluid temperature detector 105 may be an oil temperature sensor.

Proportional valve 160 controls the proportion of the generated hydraulic pressure supplied to the advance chamber 190 and the retard chamber 195 and solenoid valve 155 controls operation of the proportional valve 160.

Electronic control unit (ECU) 150 provides duty-control signals to solenoid valve 155 based on signals from detectors 105, 110, and 115 in accordance with a pre-installed program. ECU 150 preferably comprises a microprocessor and associated hardware as may be selected by a person skilled in the art to execute the pre-installed program. Preferably the pre-installed program comprises instructions for valve-timing control according to a preferred embodiment of the present invention. An exemplary valve timing control method according to a preferred embodiment of this invention will be described later in detail. ECU 150 and the pre-installed program preferably can provide more than 0.0007 degrees of resolution of crank angle change, considering the fact that the engine generally operates within the range of 30 rpm to 6,000 rpm.

ECU 150 stores map data of initial advance values and initial retard values with respect to independent variables of fluid temperature, battery voltage, and current duty-ratio. The initial advance value is a value by which the duty-ratio of the solenoid valve 155 is initially changed to make the valve timing advance, and the initial retard value is a value by which the duty-ratio of the solenoid valve 155 is initially changed to make the valve timing retard.

The proportional valve 160 operates such that when the duty-ratio of the solenoid valve 155 is either 0% and 100% only one of the advance chamber 190 and retard chamber 195 is supplied with hydraulic pressure. When the duty-ratio of the solenoid valve 155 is duty-controlled within the range between the extremes, hydraulic pressure is supplied to both of the advance chamber 190 and the retard chamber 195 in a proportion according to the duty-ratio.

Details of such a proportional valve are well known to a person skilled in the art, and accordingly are not described in this specification. The solenoid valve 155 can be realized as any kind of duty-controlled solenoid valve, however, a pulse width modulation type is preferably used.

ECU 150 supplies electric power from the vehicle battery to solenoid valve 155 in order to control the solenoid valve 155. Accordingly, solenoid valve 155 facilitates regulation of hydraulic control-pressure through the proportional valve 160 in order to enable the proportional valve 160 to appropriately direct the hydraulic pressure.

A preferred embodiment of the valve-timing control method of the present invention is hereinafter described in detail with reference to FIG. 3. At step S310, ECU 150 ascertains a current valve timing, and determines a most preferable valve timing based on a current running state of the engine (the most preferable valve timing is hereinafter referred to as target timing). Details of the step S310 are not described in further detail because the target timing can be easily determined by a person skilled in the art.

When the target timing is determined, the fluid temperature and the battery voltage is measured, and ECU 150 retrieves a learned initial value related to current valve timing from the map based on the fluid temperature and the battery voltage, at step S315. ECU 150 then changes a current duty-ratio of the solenoid valve 155 by the retrieved learned initial value, at step S320.

Figure 2:
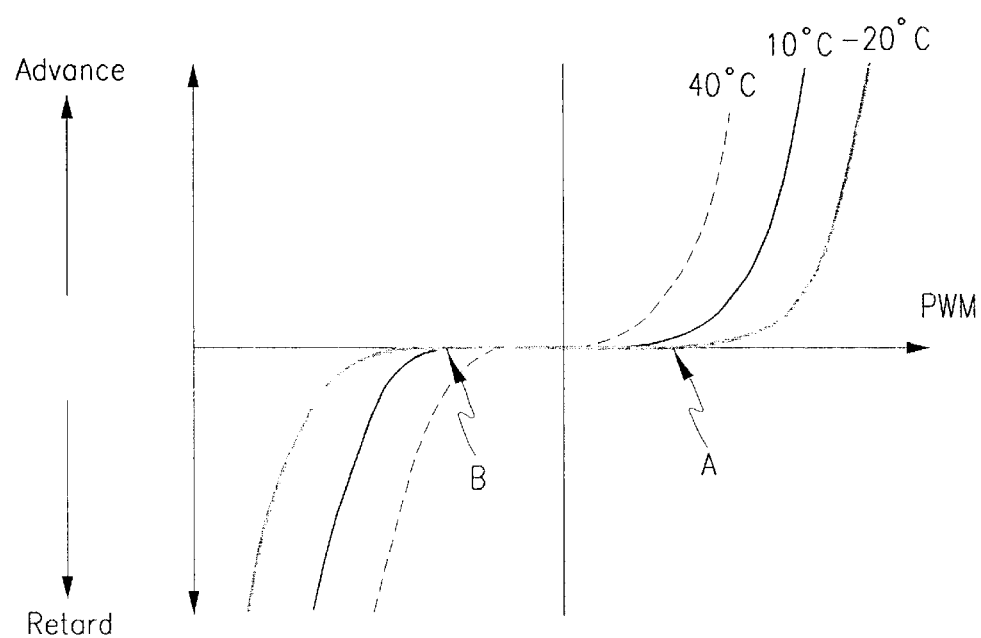
FIG. 2 is an illustration of examples of characteristic curves of valve timing in relation to the duty-ratio of a solenoid valve adapted to vary the valve timing, shown with respect to a plurality of fluid temperatures.

The initial value is retrieved from a plurality of values including an initial advance value and an initial retard value, where the initial advance value is used for the initial value of duty-ratio adjustment when the target timing is advanced from the current valve timing and the initial retard value is used for the initial value of duty-ratio adjustment when the target timing is retarded from the current valve timing. Accordingly, in the case that a current fluid temperature is −20 deg. C. and the current valve timing corresponds to the point B as shown in FIG. 2, when the target timing lies in the advance region, the current valve timing is adjusted to the point A by initially adjusting the duty-ratio of the solenoid valve 155 immediately after the target timing is determined. On the other hand, in the case that the current valve timing corresponds to the point A shown in FIG. 2, when retarding of valve timing is needed, the current valve timing is adjusted to the point B by initially adjusting the duty-ratio of the solenoid valve 155 immediately after the target timing is determined.

After the steps S315 and S320 for initially adjusting the current duty-ratio, ECU 150 gradually adjusts the current duty-ratio of the solenoid valve 155 until the current valve timing corresponds to the target timing (refer to steps S325, S330, and S335).

The current valve timing is measured at step S325, and it is determined whether the current valve timing corresponds to the target timing at step S330. If the current valve timing does not correspond to the target timing, the duty-ratio of solenoid valve 155 is changed by a predetermined value at step S335, and the current valve timing is measured again at step S325, thereby gradually adjusting the current valve timing until it corresponds to the target timing.

In the determining step S330, the current valve timing is determined to be correspond to the target timing if the current valve timing lies within a predetermined range of the target timing.

Figure 3:
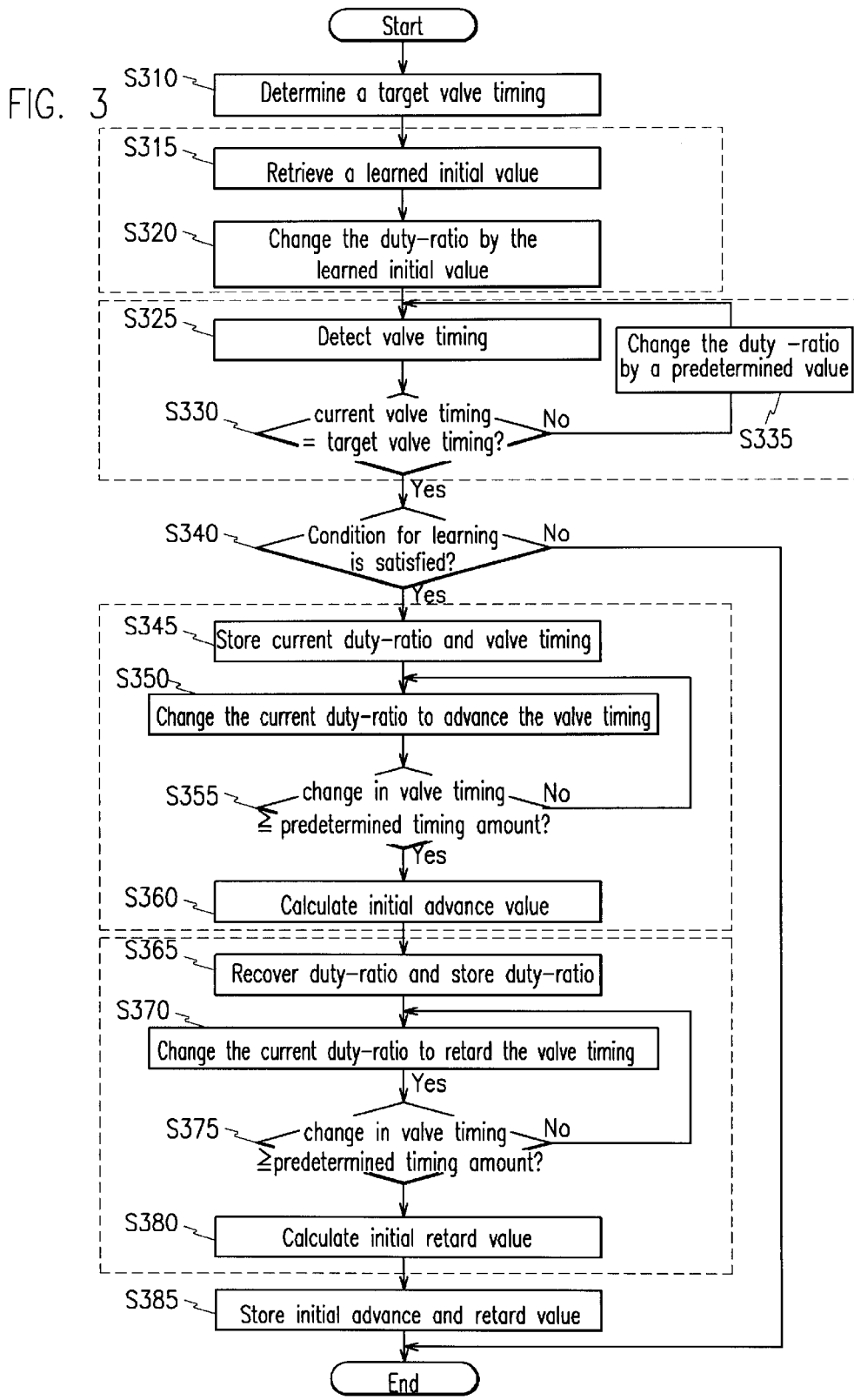
FIG. 3 is a flow-chart for showing a continuously variable valve-timing control method according to a preferred embodiment of the present invention.

Steps S340–S385 shown in FIG. 3 relate to how the initial value (chosen from initial advance and retard values) is learned.

Firstly, ECU 150 determines whether conditions for learning the initial value is satisfied at step S340. The conditions for learning preferably includes fluid temperature lying within a predetermined temperature range, battery voltage lying within a predetermined voltage range, and the current valve timing lying within a predetermined timing range. The various predetermined ranges may be determined by a person skilled in the art based on desired engine operating characteristics. This prevents the ECU 150 from learning the initial value when the fluid temperature and/or the battery voltage are abnormal. This also enables the learning to be preferably confined to a flat region of the characteristic curve (refer to FIG. 2) of the valve timing.

When the conditions for learning are satisfied, the initial advance value is learned at steps S345–S360.

In learning the initial advance value, firstly, ECU 150 stores the current duty-ratio and valve timing at step S345. Subsequently, ECU 150 changes the current duty-ratio to advance the valve timing by a predetermined advance increment at step S350, and determines whether the valve timing has accordingly changed by more than a predetermined timing amount at step S355.

When the valve timing has not changed by more than the predetermined timing amount, step S345 is executed again such that steps S345–S355 are recursively repeated until the valve timing has changed by more than the predetermined timing amount. When the valve timing has been changed by more than the predetermined timing amount, ECU 150 calculates the initial advance value at step S360.

The initial advance value is calculated as a difference between the initial current duty-ratio before recursive adjustment and the current duty-ratio recursively adjusted to just before the valve timing is advanced by more than the predetermined timing amount. Therefore, no abrupt change in valve timing will occur during a next valve timing control when the duty-ratio is initially changed by the learned initial advance value.

When the condition for learning is satisfied, the initial retard value is also learned at steps S365–S380. In learning the initial retard value, firstly, ECU 150 reestablishes the duty-ratio to the value before step S345, and stores the current duty-ratio and valve timing at step S365. Subsequently ECU 150 changes the current duty-ratio to retard the valve timing by a predetermined retard increment at step S370, and determines whether the valve timing has accordingly changed by more than a predetermined timing amount at step S375.

When the valve timing has not changed by more than the predetermined timing amount, step S365 is executed again such that steps S365–S375 are recursively repeated until the valve timing has changed by more than the predetermined timing amount. When the valve timing has been changed to more than the predetermined timing amount, the ECU 150 calculates the initial retard value at step S380.

The initial retard value is calculated as a difference between the initial current duty-ratio before recursive adjustment and the current duty-ratio recursively adjusted to just before the valve timing is retarded by more than the predetermined timing amount. Therefore, no abrupt change in valve timing will occur during a next valve-timing control when the duty-ratio is initially changed by the learned initial retard value.

When the initial advance and retard values are learned, ECU 150 stores the learned initial advance and retard values at step S385. While storing values at step S385, ECU 150 measures the fluid temperature and battery voltage, and stores the learned values as map data independent variables.

As shown above, valve timing is more rapidly controlled to a target timing and therefore the valve timing can be more precisely controlled, according to the preferred embodiment of this invention.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A valve-timing control method, comprising:

determining a target timing of the valve timing;

initially-adjusting a current duty-ratio of an actuator adapted to vary the valve timing by a learned initial value, wherein said initial value is chosen from a plurality of values including an initial advance value and an initial retard value, the initial advance value being an initial value of adjustment when the target timing is advanced from a current valve timing, the initial retard value being an initial value of adjustment when the target timing is retarded from the current valve timing;

gradually-adjusting the current duty-ratio until the current valve timing corresponds to the target timing;

determining if a condition for learning the initial value is satisfied;

learning the initial advance value when the condition for learning the initial value is satisfied;

learning the initial retard value when the condition for learning the initial value is satisfied; and storing the initial advance value and initial retard value;
wherein said learning the initial advance value comprises recursively adjusting the current duty-ratio of the actuator by a predetermined advance increment until the valve timing is advanced by more than a predetermined timing amount, and the initial advance value is learned as a difference between the initial current duty-ratio before recursive adjustment and the current duty-ratio recursively adjusted to just before the valve timing is advanced by more than the predetermined timing amount.

2. The valve-timing control method of claim 1, wherein, in said determining if a condition for learning the initial value is satisfied, the condition for learning the initial value is determined to be satisfied if:

a fluid temperature, the fluid being used for control of the valve timing, lies within a predetermined temperature range;

a battery voltage lies within a predetermined voltage range; and the current valve timing lies within a predetermined timing range.

3. A valve-timing control method, comprising:

determining a target timing of the valve timing;

initially-adjusting a current duty-ratio of an actuator adapted to vary the valve timing by a learned initial value, wherein said initial value is chosen from a plurality of values including an initial advance value and an initial retard value, the initial advance value being an initial value of adjustment when the target timing is advanced from a current valve timing, the initial retard value being an initial value of adjustment when the target timing is retarded from the current valve timing;

gradually-adjusting the current duty-ratio until the current valve timing corresponds to the target timing;

determining if a condition for learning the initial value is satisfied;

learning the initial advance value when the condition for learning the initial value is satisfied;

learning the initial retard value when the condition for learning the initial value is satisfied; and storing the initial advance value and initial retard value;
wherein said learning the initial retard value comprises recursively adjusting the current duty-ratio of the actuator by a predetermined retard increment until the valve timing is retarded by more than a predetermined timing amount; and the initial retard value is learned, in said learning the initial retard value, as a difference between the initial current duty-ratio before recursive adjustment and the current duty-ratio recursively adjusted to just before the valve timing is retarded by more than the predetermined timing amount.

4. A valve-timing control method, comprising:

determining a target timing of the valve timing;

initially-adjusting a current duty-ratio of an actuator adapted to vary the valve timing by a learned initial value, wherein said initial value is chosen from a plurality of values including an initial advance value and an initial retard value, the initial advance value being an initial value of adjustment when the target timing is advanced from a current valve timing, the initial retard value being an initial value of adjustment when the target timing is retarded from the current valve timing;

gradually-adjusting the current duty-ratio until the current valve timing corresponds to the target timing;

determining if a condition for learning the initial value is satisfied;

learning the initial advance value when the condition for learning the initial value is satisfied;

learning the initial retard value when the condition for learning the initial value is satisfied;

storing the initial advance value and initial retard value;

detecting fluid temperature, the fluid being used for control of the valve timing; and detecting battery voltage,
wherein, in said storing the initial advance value and initial retard value, the initial values are stored based on parameters including the fluid temperature and the battery voltage.

5. Apparatus for controlling valve timing of a valve of an engine, the valve-timing control apparatus comprising:

a valve-timing detector adapted to detect the valve timing;

an advance chamber and a retard chamber for advancing and retarding the valve timing by inflow of hydraulic fluid;

a hydraulic pump for generating hydraulic pressure;

a proportional valve for controlling a proportion of the generated hydraulic pressure supplied to the advance chamber and retard chamber;

an actuator for controlling operation of the proportional valve;

an electronic control unit for executing predetermined instructions for duty-control of the actuator, the predetermined instructions comprising:

initially-adjusting a current duty-ratio of an actuator controlling the proportional valve to vary the valve timing by a learned initial value, wherein said initial value is chosen from a plurality of values including an initial advance value and an initial retard value, the initial advance value being an initial value of adjustment when a target timing is advanced from a current valve timing, the initial retard value being an initial value of adjustment when the target timing is retarded from the current valve timing;

gradually-adjusting the current duty-ratio until the current valve timing corresponds to the target timing;

determining if a condition for learning the initial value is satisfied;

learning the initial advance value when the condition for learning the initial value is satisfied;

learning the initial retard value when the condition for learning the initial value is satisfied; and storing the initial advance value and initial retard value;

wherein said learning the initial advance value comprises recursively adjusting the current duty-ratio of the actuator by a predetermined advance increment until the valve timing is advanced by more than a predetermined timing amount;

the initial advance value is learned, in said learning the initial advance value, as a difference between the initial current duty-ratio before recursive adjustment and the current duty-ratio recursively adjusted to just before the valve timing is advanced by more than the predetermined timing amount;

said learning the initial retard value comprises recursively adjusting the current duty-ratio of the actuator by a predetermined retard increment until the valve timing is retarded by more than a predetermined timing amount; and the initial retard value is learned, in said learning the initial retard value, as a difference between the initial current duty-ratio before recursive adjustment and the current duty-ratio recursively adjusted to just before the valve timing is retarded by more than the predetermined timing amount.

6. The valve-timing control apparatus of claim 5, further comprising:

a temperature detector for detecting fluid temperature, the fluid being used for control of the valve timing; and a voltage detector for detecting battery voltage, wherein the condition for learning the initial value is determined to be satisfied if:

the fluid temperature lies within a predetermined temperature range;

the battery voltage lies within a predetermined voltage range; and the current valve timing lies within a predetermined timing range.

7. Apparatus for controlling valve timing of a valve of an engine, the valve-timing control apparatus comprising:

a valve-timing detector adapted to detect the valve timing;

an advance chamber and a retard chamber for advancing and retarding the valve timing by inflow of hydraulic fluid;

a hydraulic pump for generating hydraulic pressure;

a proportional valve for controlling a proportion of the generated hydraulic pressure supplied to the advance chamber and retard chamber;

an actuator for controlling operation of the proportional valve;

an electronic control unit for executing predetermined instructions for duty-control of the actuator, the predetermined instructions comprising:

initially-adjusting a current duty-ratio of an actuator controlling the proportional valve to vary the valve timing by a learned initial value, wherein said initial value is chosen from a plurality of values including an initial advance value and an initial retard value, the initial advance value being an initial value of adjustment when a target timing is advanced from a current valve timing, the initial retard value being an initial value of adjustment when the target timing is retarded from the current valve timing;

gradually-adjusting the current duty-ratio until the current valve timing corresponds to the target timing;

determining if a condition for learning the initial value is satisfied;

learning the initial advance value when the condition for learning the initial value is satisfied;

learning the initial retard value when the condition for learning the initial value is satisfied; and storing the initial advance value and initial retard value;

a temperature detector for detecting fluid temperature, the fluid being used for control of the valve timing; and a voltage detector for detecting battery voltage, wherein, in said storing the initial advance value and initial retard value, the initial advance and retard values are stored based on parameters including the fluid temperature and the battery voltage.

* * * * *